US010767484B2

(12) United States Patent
Pouzet et al.

(10) Patent No.: US 10,767,484 B2
(45) Date of Patent: Sep. 8, 2020

(54) ROTOR DISK COMPRISING A VARIABLE THICKNESS WEB

(71) Applicant: SAFRAN AIRCRAFT ENGINES, Paris (FR)

(72) Inventors: Emilie Pouzet, Fontainebleau (FR); Didier Desire Rene Pasquiet, Boissise le Roi (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/714,385

(22) Filed: Sep. 25, 2017

(65) Prior Publication Data
US 2018/0094526 A1   Apr. 5, 2018

(30) Foreign Application Priority Data

Sep. 30, 2016   (FR) ...................................... 16 59456

(51) Int. Cl.
*F01D 5/06*   (2006.01)
*F01D 5/30*   (2006.01)
*F01D 11/00*   (2006.01)

(52) U.S. Cl.
CPC ............... *F01D 5/066* (2013.01); *F01D 5/06* (2013.01); *F01D 5/3007* (2013.01);
(Continued)

(58) Field of Classification Search
CPC .......... F01D 5/06; F01D 5/066; F01D 5/3015; F01D 11/008
See application file for complete search history.

(56) References Cited

U.S. PATENT DOCUMENTS 3,146,938 A * 9/1964 Smith .................. F04D 29/164
                                                        415/173.7
5,630,703 A * 5/1997 Hendley ................. F01D 5/081
                                                        416/220 R
(Continued)

FOREIGN PATENT DOCUMENTS

RU      2 485 325 C1      6/2013
RU      2485325 C1 *      6/2013   .............. F01D 5/06
WO      WO 2012/056161 A1  5/2012

OTHER PUBLICATIONS

French Preliminary Search Report dated May 30, 2017 in French Application 16 59456 filed on Sep. 30, 2016 (with English Translation of Categories of Cited Documents).

*Primary Examiner* — Kevin R Steckbauer
(74) *Attorney, Agent, or Firm* — Oblon, McClelland, Maier & Neustadt, L.L.P.

(57) ABSTRACT

A disk of a rotor including an annular radial web, a radially central hub located at the inner radial end of the web and a rim located at the outer radial end of the web, the web including an upstream face and a downstream face, and a plurality of orifices through which bolts pass for the attachment of at least one annular flange forming part of another adjacent rotor disk on either the upstream face or the downstream face of the web, or on both faces. The upstream face and/or the downstream face of the web includes a globally annular shaped indentation, with a bottom set back along the axial direction inwards into the web, and that extends radially outwards from the hub of the disk towards the rim, and that surrounds a radially inner part of each of the orifices of the web, at a distance.

9 Claims, 2 Drawing Sheets

(52) U.S. Cl.
CPC ........ *F01D 11/008* (2013.01); *F05D 2220/30* (2013.01); *F05D 2220/323* (2013.01); *F05D 2240/20* (2013.01); *F05D 2240/60* (2013.01); *F05D 2260/30* (2013.01); *Y02T 50/671* (2013.01)

(56) References Cited

U.S. PATENT DOCUMENTS

| | | | | |
|---|---|---|---|---|
| 6,655,920 | B2 * | 12/2003 | Beutin | F01D 5/063 415/199.5 |
| 7,210,909 | B2 * | 5/2007 | Escure | F01D 5/066 29/402.03 |
| 7,390,170 | B2 * | 6/2008 | Charrier | F16L 23/036 415/216.1 |
| 8,602,734 | B2 * | 12/2013 | Philippot | F01D 5/081 415/115 |
| 8,662,835 | B2 * | 3/2014 | Fachat | F01D 11/001 415/173.5 |
| 9,188,008 | B2 * | 11/2015 | Coutandin | F02D 5/081 |
| 9,371,742 | B2 * | 6/2016 | Belmonte | F01D 5/066 |
| 9,683,452 | B2 * | 6/2017 | Luneau | F01D 11/001 |
| 2002/0187046 | A1 * | 12/2002 | Beutin | F01D 5/063 416/223 B |
| 2003/0146578 | A1 * | 8/2003 | Girard | F01D 25/246 277/416 |
| 2005/0025625 | A1 * | 2/2005 | Escure | F04D 29/321 416/198 A |
| 2005/0246889 | A1 * | 11/2005 | Charrier | F01D 5/066 29/700 |
| 2009/0004006 | A1 * | 1/2009 | Dejaune | F01D 5/081 416/95 |
| 2011/0027103 | A1 * | 2/2011 | Philippot | F01D 5/3015 416/97 R |
| 2011/0127352 | A1 * | 6/2011 | Fachat | F01D 11/001 239/265.15 |
| 2012/0328414 | A1 * | 12/2012 | Coutandin | F01D 11/001 415/116 |
| 2013/0209238 | A1 * | 8/2013 | Belmonte | F01D 25/12 415/116 |
| 2014/0105732 | A1 * | 4/2014 | Luneau | F01D 11/001 415/174.4 |

\* cited by examiner

ROTOR DISK COMPRISING A VARIABLE THICKNESS WEB

BACKGROUND OF THE INVENTION

Field of the Invention

This invention relates to a turbomachine rotor disk comprising an indentation shaped to improve the stress distribution in the disk web.

The invention relates more particularly to a rotor disk comprising a web pierced to allow the passage of an attachment screw for at least one flange fixing another disk to said rotor disk.

Description of the Related Art

An aircraft turbomachine, particularly the low pressure turbine of the turbomachine, comprises a plurality of rotor disks each extending globally in a radial plane relative to the main axis of the turbomachine and that are fixed to each other.

According to one embodiment, disks are fixed to each other by bolting an annular flange originating from one rotor disk onto the web of another rotor disk.

There is a plurality of orifices in the web of the other disk through which fastening bolts can be passed, for this purpose.

When the turbomachine is in operation, thermal and centrifugal stresses are applied on the disk web and these stresses are higher at the orifices formed in the perforated web. One consequence of these local stress concentrations in the web is a large reduction in the life of the rotor.

It has been suggested that the rotor life can be extended by increasing the web thickness around the orifices. Such an embodiment increases the mass on the web, which induces higher stresses due to centrifugal force and therefore reduces the efficiency of the solution.

Another proposal is to make oblong orifices in the web, between orifices in which assembly screws will fit.

These orifices have an influence on the stress distribution in the web but they also have a negative influence on rotor ventilation air flows by allowing air to circulate between cavities located between the webs of the different disks.

The purpose of the invention is to disclose a turbomachine rotor that is made in a manner so as to reduce stresses generated during operation of the turbomachine, and caused by the presence of orifices in the web.

BRIEF SUMMARY OF THE INVENTION

The invention discloses a rotor disk comprising, relative to the principal axis of the disk, an annular radial web, a radially central hub located at the inner radial end of the web and a rim located at the outer radial end of the web, the web comprising an upstream face and a downstream face relative to the main axis of the disk, and a plurality of orifices through which bolts are to pass for the attachment of at least one annular flange forming part of another adjacent rotor disk on either the upstream face or the downstream face of the web, or on both faces, characterised in that said upstream face and/or said downstream face of the web comprises a globally annular shaped indentation, the bottom of which is set back along the axial direction inwards into the web relative to other parts of said upstream face and/or said downstream face and that extends radially outwards from the disk hub towards the rim, and that surrounds a radially inner part of each of the web orifices, at a distance.

The presence of such an indentation that partly surrounds all the orifices in the web modifies the stress distribution in the web, making it different from the stress distribution in a web with a constant cross-section.

Preferably, the indentation is composed of an alternation of first parts in which the outer radial end of each first part partly surrounds an orifice in the web, and second parts each of which is located between two first adjacent parts and between two adjacent orifices 28.

Preferably, each second part comprises a radially outer edge that is offset radially outwards from a radially outer edge of each of the first two parts associated with it.

Preferably, the radially outer edge of each second part is offset radially outwards from the orifices.

Preferably, each of the upstream face and the downstream face of the web comprises an indentation.

Preferably, the geometry of the indentation in the upstream face is different from the geometry of the indentation in the downstream face.

Preferably, the geometry of the indentation in the upstream face is identical to the geometry of the indentation in the downstream face.

The invention also relates to a turbomachine rotor comprising a first disk coaxial with the principal axis of the rotor that is made according to the invention, and a second disk coaxial with the principal axis of the rotor that comprises an annular flange for attachment of the second disk to the first disk, the annular flange comprising an inner periphery composed of alternating solid parts and hollow parts and comprising a contact face locating in a radial plane relative to the principal axis of the rotor that is located facing and in contact with a contact surface of the web of the first disk with the flange of the second disk, characterised in that the geometry of said contact surface of the web is complementary to the geometry of the indentation formed in the face of the web and is identical to the geometry of the flange assembly surface.

BRIEF DESCRIPTION OF THE DRAWINGS

Other characteristics and advantages of the invention will become clear after reading the following detailed description, that will be better understood by referring to the appended figures among which.

DETAILED DESCRIPTION OF THE INVENTION

Figure 1:
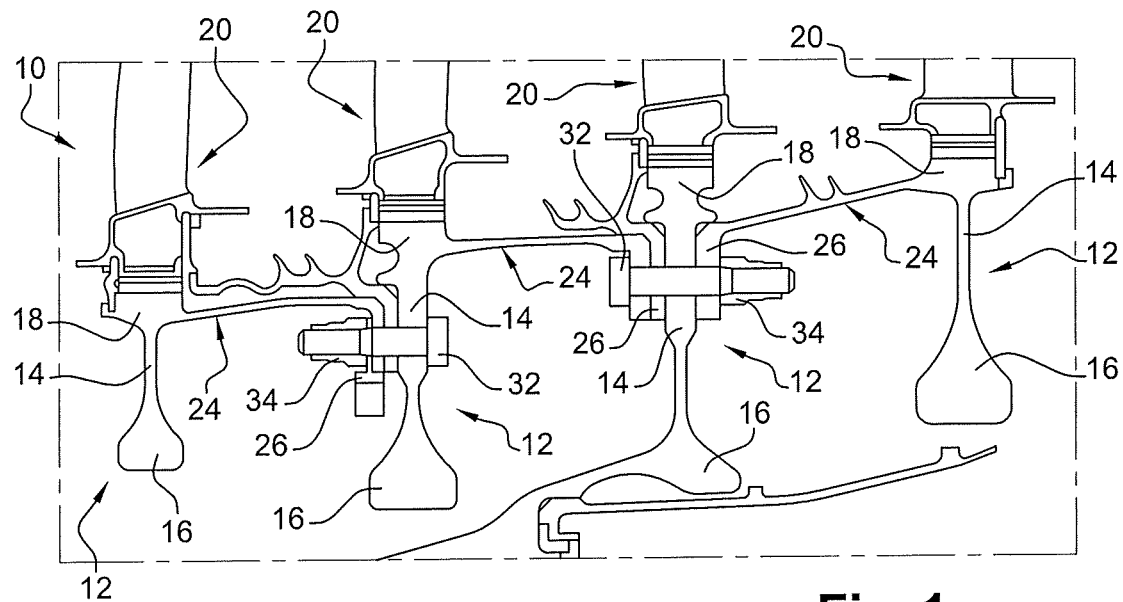
FIG. 1 is a diagrammatic cross-sectional view in an axial plane of a part of the low pressure turbine of a turbomachine comprising at least one rotor disk made according to the invention.

FIG. 1 shows part of a low pressure turbine 10 of a turbomachine that in particular comprises several rotor disks 12, each of which corresponds to a stage of the turbine 10.

Each rotor disk 12 is coaxial with the principal axis A of the turbomachine and comprises an annular radial web 14, a radially central hub 16 located at the inner radial end of the web 14 and a rim 18 located at the outer radial end of the web 14.

The rim 18 is shaped so as to support the blades 20 of the stage of the turbine 10, and it comprises a series of grooves 22 formed in its peripheral edge for this purpose, into which the roots of the blades 20 fit.

All the disks 12 of the low pressure turbine 10 are fixed in rotation about the principal axis of the turbomachine.

To achieve this, some disks 12 are provided with an annular plate 24 that extends in the axial direction towards an adjacent disk 12. The axial free end of the free end of the plate 24 consists of an annular flange 26 that is fixed to the web 14 of the adjacent disk.

According to the embodiment shown on FIG. 1, referring to disks in order from the upstream end to the downstream end along the direction of gas flow in the turbomachine, that will be the axial orientation from left to right in the figure, the first disk 12, in other words the leftmost disk, comprises a plate 24 that extends axially in the downstream direction as far as the second disk; the second disk 12 comprises a plate 24 that extends axially in the downstream direction as far as the third disk 12 and the fourth disk 12 comprises a plate 24 that extends axially in the upstream direction as far as the third disk 12.

The third disk 12 does not have a plate 24 and two flanges are fitted onto it on each side of this third disk 12.

It will be understood that the invention is not limited to this distribution of plates 24 and that this invention can apply to any variant.

In the following description, reference will be made to either the second or the third disk 12, on which the flange 26 of a plate 24 is fitted.

Each flange 26 is fixed to the web 14 associated with it by bolting, in other words a plurality of screw 32 and nut 24 assemblies that tighten the flange(s) onto the web 14. To achieve this, the web 14 comprises a plurality of orifices 28 passing through the web 14 and that are arranged to be in line with the orifices formed in the flanges 26.

In the case of the third disk 12 onto which the flange 26 from the second disk 12 and the flange 26 from the fourth disk 12 are fixed, each orifice 28 in the web 14 is aligned with an orifice 30 in the flange 26 originating from the second disk 12 with an orifice 30 of the flange 26 originating from the fourth disk 12.

Each flange 26 of the first, second or fourth disk 12 is in contact with an upstream face 14a or a downstream face 14b of the web 14 of the second or the third disk 12.

Each of the upstream faces 14a and the downstream faces 14b extends in a radial plane relative to the principal axis of the disk, in other works a plane perpendicular to the principal axis of the disk 12.

Each flange 26 comprises a radial face that is brought into tight contact with the upstream or downstream face 14a, 14b of the web 14 by bolts 32, 34.

During operation of the turbomachine, the rotation speed of the rotor and the high temperature in the turbomachine create stresses in the web 14 that are concentrated particularly at the orifices 28.

Either and/or both of the upstream face 14a and the downstream face 14b of the web 14 comprises an indentation 36, the bottom of which is set back in the axial direction from the other parts of said upstream 14a or downstream 14b face, to make the stress distribution in the web 14 more uniform.

The indentation 36 is located in the radially inner part of the web 14, in other words it extends radially outwards from the hub 16 and towards the rim 18, and more particularly the web 14 is connected to the hub 16 starting from a radially inner edge of the web 14 at said edge.

The indentation 36 is generally in annular form, in other words it extends all around the principal axis of the disk 12.

Figure 3:
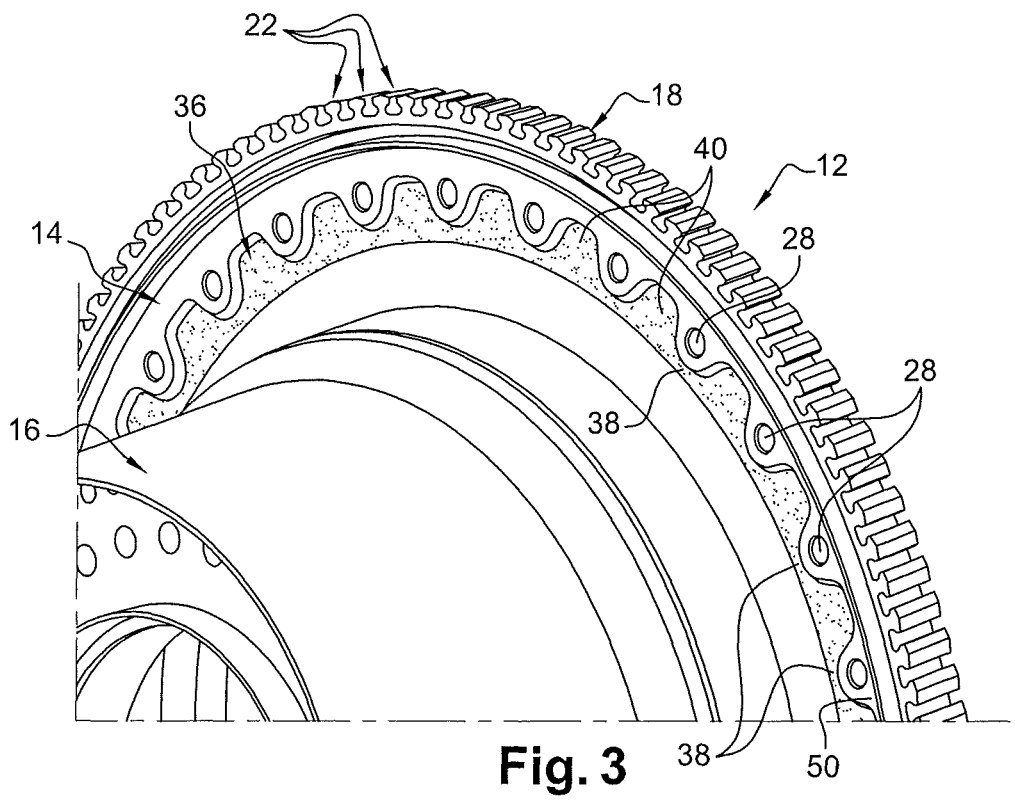
FIG. 3 is a perspective view of a rotor disk shown in FIGS. 1 and 2, the web of which comprises an indentation according to the invention.
Figure 4:
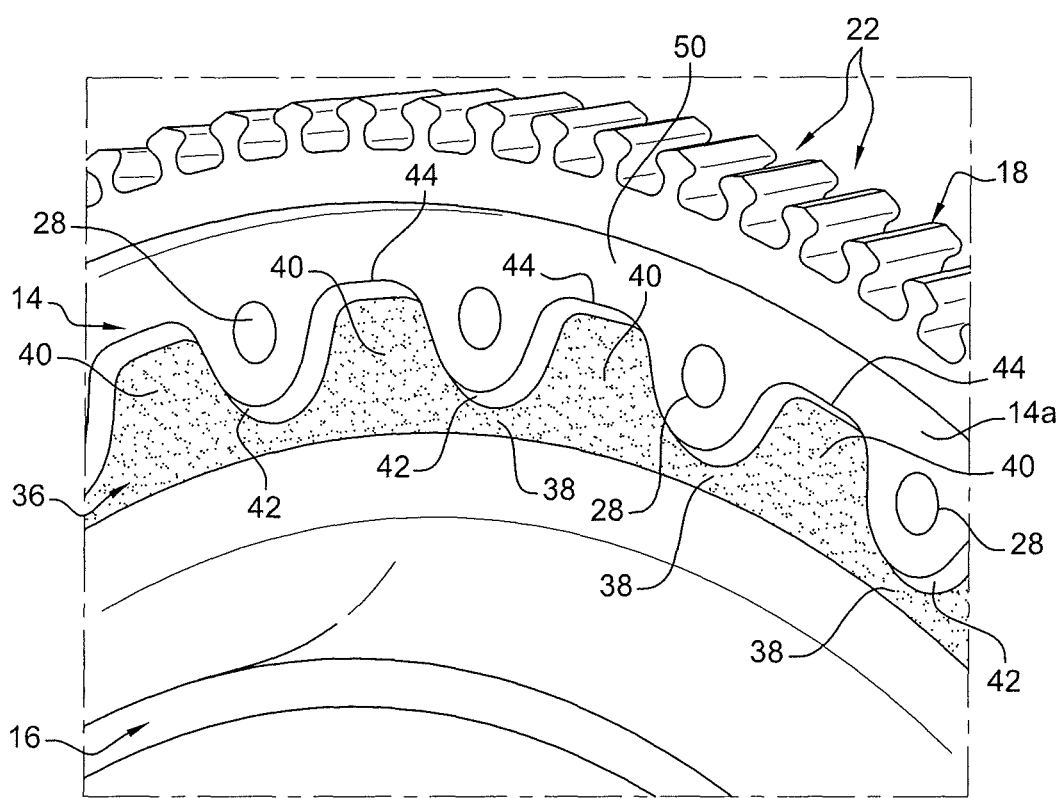
FIG. 4 is a larger scale detail of the web of the rotor disk shown in FIG. 3, demonstrating the configuration of the indentation according to the invention.

The indentation 36 partly surrounds the orifices 28 in the web, in other words, as can be seen on FIGS. 3 and 4, the radially outer edge of the indentation 36 extends at a distance from the orifices 28 and is located partially set back inwards from the orifices 28.

The indentation 36 is composed of an alternation of first parts 38 that are located radially facing the orifices 28 in the web 14 and second parts 40 located between two adjacent first parts 38 and between two adjacent orifices 28, so as to form an indentation 36 with a single surface.

Each first part 38 of the indentation 36 comprises an edge 42 at the radially outer end that extends around and at a distance from an orifice 28 in the web 14.

In this case, as can be seen in more detail in FIG. 4, the outer edge 42 of each first part 38 forms the arc of a circle open radially outwards and centred on the centre of the associated orifice 28.

Each second part 40 of the indentation 36 comprises an edge 44 at the radially outer end that is radially offset outwards from the outer edge 42 of each first part 38.

The outer edge 44 of each second part 40 is straight and is oriented perpendicular to a radial direction relative to the principal axis of the disk 12.

According to another embodiment, the outer edge 44 of each second part 40 is in the form of the arc of a circle centred on the principal axis of the disk 12.

The outer edge 44 of each second part 40 is offset radially outwards from the orifices 28 in the web 14.

The radial positions of the outer edges 42, 44 of the first parts 38 and the second parts 40 of the indentation 36 are determined so as to reduce internal stresses in the web 14 at its orifices 28.

Figure 2:
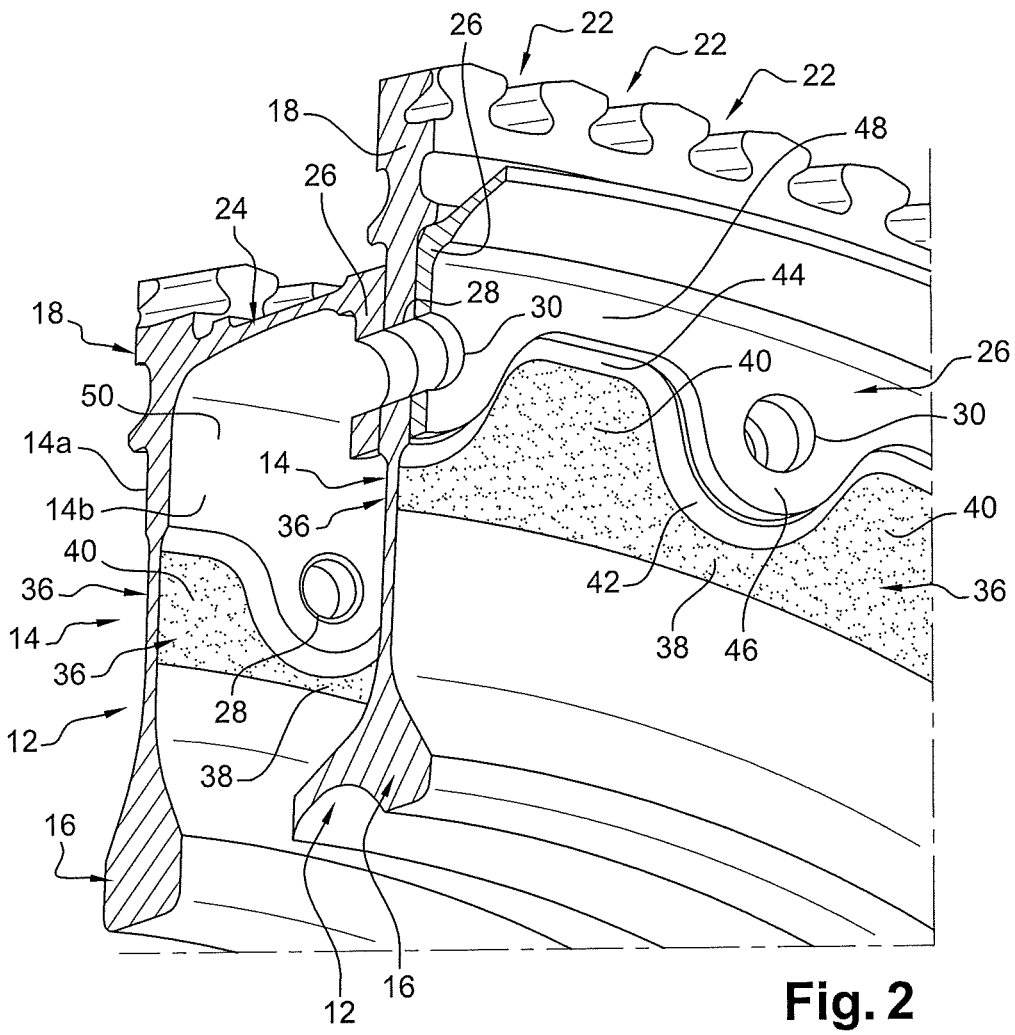
FIG. 2 is a diagrammatic perspective tear-out view of two rotor disks shown in FIG. 1 at a larger scale, showing the webs made according to the invention.

As can be seen with reference to FIG. 2, the disk 12 that is shown in the foreground can also be fitted with an annular flange 26 that is also shaped so as to reduce internal stresses occurring in it at its own orifices 30.

According to this embodiment, the internal periphery of the flange 26 is garlanded, in other words it is composed of an alternation of solid parts 46 and hollow parts 48, the solid parts projecting radially inwards from the bottom of the hollow parts 48, surrounding the orifices 30 of the flange 26.

The flange 26 comprises a contact surface located in a radial plane relative to the principal axis of the disk 12 that is positioned facing and in contact with the upstream or downstream face 14a, 14b of the web 14.

The upstream face 14a or the downstream face 14b of the web 14 comprises a contact surface 50 with the associated flange 26 that has a geometry complementary to the geometry of the surface of the indentation 36.

According to one preferred embodiment, the geometry of this contact surface is identical to the geometry of the contact surface of the flange 26.

This, when the flange 26 is assembled onto disk 12 by bolting, the two facing contact surfaces cover each other entirely, which reduced pounding between surfaces.

As can be seen in FIG. 2, in the case of the third disk 12 that is shown in the foreground and onto which a flange 26 is installed on each of the upstream face 14a and the downstream face 14b of the web 14, each of the upstream face 14a and the downstream face 14b of the web 14 thus comprises an indentation.

In the embodiment shown, the geometries of the two indentations of this web 14 are identical.

It will be understood that the invention is not limited to this embodiment. Thus, according to another embodiment, the geometries of the indentations 36 on the two faces 14a, 14b of the web 14 are different, particularly concerning the circumferential extent or the radial extent of each of the parts 38, 40 of the indentation 36.

Similarly, the axial dimensions and particularly the depth of the indentation 36 formed on the upstream face 14a or on the downstream face 14b of the web 14 of a disk 12 can be identical to or different from the same axial dimensions of the indentation 36 formed on a face 14a, 14b of the web 14 of another disk 12.

According to yet another aspect of the invention, as can be seen on FIG. 2, concerning the second disk 12 that is shown in the background, only the front face 14a of the web 14 will be fitted with the flange 26 of the first disk 12 that is shown in FIG. 1 only. According to this other aspect, the two faces 14a, 14b of the web 14 comprise an indentation 36, in other words even the downstream face 14b, on which no flange is fitted.

The invention claimed is:

1. A disk of a rotor comprising, relative to a principal axis of the disk:
   an annular radial web;
   a radially central hub located at an inner radial end of the web; and
   a rim located at an outer radial end of the web,
   the web comprising an upstream face and a downstream face, relative to the principal axis of the disk, and a plurality of orifices through which bolts are to pass for attachment of at least one annular flange forming part of another adjacent rotor disk on either the upstream face or the downstream face of the web, or on both faces,
   wherein at least one of said upstream face or said downstream face of the web comprises only a single indentation of generally annular form, a bottom of the indentation is set back along an axial direction inwards into the web, relative to a remaining part of said at least one of said upstream face or said downstream face and that extends radially outwards from the hub of the disk towards the rim, and that surrounds a radially inner part of each of the orifices of the web, at a distance.

2. The disk of a rotor according to claim 1, wherein the indentation is composed of an alternation of first parts wherein an outer radial end of each first part partly surrounds one of the plurality of orifices in the web, and second parts each of which is located between two first adjacent parts and between two adjacent orifices of the plurality of orifices.

3. The disk of a rotor according to claim 2, wherein each second part comprises a radially outer edge that is offset radially outwards from a radially outer edge of each of the two first adjacent parts associated with the second part.

4. The disk of a rotor according to claim 2, wherein a radially outer edge of each second part is offset radially outwards from the orifices.

5. The disk of a rotor according to claim 1, wherein each of the upstream face and the downstream face of the web comprises an indentation.

6. The disk of a rotor according to claim 5, wherein a geometry of the indentation in the upstream face is different from a geometry of the indentation in the downstream face.

7. The disk of a rotor according to claim 5, wherein a geometry of the indentation in the upstream face is identical to a geometry of the indentation in the downstream face.

8. A turbomachine rotor comprising:
   a first disk that is made according to claim 1; and
   a second disk coaxial with the principal axis of the disk that comprises an annular flange for attachment of the second disk to the first disk,
   the annular flange comprising an inner periphery composed of alternating solid parts and hollow parts and comprising a contact face located in a radial plane relative to the principal axis of the disk that is located facing and in contact with a contact surface of the web of the first disk.

9. The disk of a rotor according to claim 2, wherein the outer radial end of each first part forms an arc of a circle open radially outwards and centered on a center of the one of the plurality of orifices.

* * * * *